(12) United States Patent
Kelly et al.

(10) Patent No.: US 7,893,890 B2
(45) Date of Patent: Feb. 22, 2011

(54) ELECTRICALLY DIMMABLE COMBINER OPTICS FOR HEAD-UP DISPLAY

(75) Inventors: Brian D. Kelly, Redmond, WA (US); Emma Romig, Seattle, WA (US)

(73) Assignee: The Boeing Company, Chicago, IL (US)

( * ) Notice: Subject to any disclaimer, the term of this patent is extended or adjusted under 35 U.S.C. 154(b) by 709 days.

(21) Appl. No.: 11/682,255

(22) Filed: Mar. 5, 2007

(65) Prior Publication Data
US 2008/0218434 A1    Sep. 11, 2008

(51) Int. Cl.
*G09G 5/00*    (2006.01)
(52) U.S. Cl. ................... 345/8; 345/9; 348/15
(58) Field of Classification Search ................ 345/102, 345/7–9, 35, 36, 37, 38
See application file for complete search history.

(56) References Cited

U.S. PATENT DOCUMENTS

| | | | |
|---|---|---|---|
| 4,135,790 A | 1/1979 | Takahashi et al. |
| 4,214,820 A | 7/1980 | Leibowitz et al. |
| 4,229,080 A | 10/1980 | Take et al. |
| 4,286,308 A | 8/1981 | Wolff |
| 4,893,908 A | 1/1990 | Wolf et al. |
| 4,993,810 A | 2/1991 | Demiryont |
| 5,042,923 A | 8/1991 | Wolf et al. |
| 5,069,535 A | 12/1991 | Baucke et al. |
| 5,097,358 A | 3/1992 | Ito et al. |
| 5,384,653 A | 1/1995 | Benson et al. |
| 5,457,564 A | 10/1995 | Leventis et al. |
| 5,598,293 A | 1/1997 | Green |
| 5,654,786 A | 8/1997 | Bylander |
| 5,699,192 A | 12/1997 | Van Dine et al. |
| 5,724,176 A | 3/1998 | Nishikitani et al. |
| 5,729,379 A | 3/1998 | Allemand et al. |
| 5,764,402 A | 6/1998 | Thomas et al. |
| 5,805,330 A | 9/1998 | Byker et al. |
| 5,838,483 A | 11/1998 | Teowee et al. |
| 5,878,809 A | 3/1999 | Heinle |
| 5,888,431 A | 3/1999 | Tonar et al. |
| 6,005,705 A | 12/1999 | Schmidt et al. |
| 6,011,642 A | 1/2000 | Vink et al. |

(Continued)

FOREIGN PATENT DOCUMENTS

DE    102006006290    2/2007

(Continued)

OTHER PUBLICATIONS

Bonsor, "How Smart Windows Work", retrieved on Jun. 14, 2006 at <<http//electronics.howstuffworks.com/smart-window.htm/printable>>, HowStuffWorks, Inc., pp. 1-9.

(Continued)

*Primary Examiner*—Duc Q Dinh
(74) *Attorney, Agent, or Firm*—Lee & Hayes, PLLC

(57) ABSTRACT

Methods and systems for providing an electrically dimmable combiner optics for head-up displays are disclosed. In one embodiment, a dimmable head-up display includes a display portion configured to provide head-up display information to an operator. Additionally, a dimmable portion is coupled to the display portion configured to change a transmissivity of the display portion from a first transmissivity level to a second transmissivity level.

16 Claims, 8 Drawing Sheets

U.S. PATENT DOCUMENTS

| | | | |
|---|---|---|---|
| 6,056,410 | A | 5/2000 | Hoekstra et al. |
| 6,130,772 | A | 10/2000 | Cava |
| 6,136,161 | A | 10/2000 | Yu et al. |
| 6,178,034 | B1 | 1/2001 | Allemand et al. |
| 6,222,177 | B1 | 4/2001 | Bechtel et al. |
| 6,246,505 | B1 | 6/2001 | Teowee et al. |
| 6,280,882 | B1 | 8/2001 | Vallee et al. |
| 6,297,900 | B1 | 10/2001 | Tulloch et al. |
| 6,317,248 | B1 | 11/2001 | Agrawal et al. |
| 6,433,913 | B1 | 8/2002 | Bauer et al. |
| 6,471,360 | B2 | 10/2002 | Rukavina et al. |
| 6,493,128 | B1 | 12/2002 | Agrawal et al. |
| 6,501,587 | B1 | 12/2002 | Ferraris et al. |
| 6,515,787 | B1 | 2/2003 | Westfall et al. |
| 6,535,126 | B2 | 3/2003 | Lin et al. |
| 6,561,460 | B2 | 5/2003 | Rukavina et al. |
| 6,567,708 | B1 | 5/2003 | Bechtel et al. |
| 6,580,472 | B1 | 6/2003 | Willingham et al. |
| 6,587,250 | B2 | 7/2003 | Armgarth et al. |
| 6,594,065 | B2 | 7/2003 | Byker et al. |
| 6,639,708 | B2 | 10/2003 | Elkadi et al. |
| 6,707,590 | B1 | 3/2004 | Bartsch |
| 6,731,253 | B1 * | 5/2004 | Arnold ............... 345/8 |
| 6,747,780 | B2 | 6/2004 | Xu et al. |
| 6,783,099 | B2 | 8/2004 | Rukavina et al. |
| 6,819,367 | B1 | 11/2004 | Cava |
| 6,822,778 | B2 | 11/2004 | Westfall et al. |
| 6,843,068 | B1 | 1/2005 | Wacker |
| 6,848,653 | B2 | 2/2005 | Finke et al. |
| 6,954,300 | B2 | 10/2005 | Varaprasad et al. |
| 7,221,363 | B2 * | 5/2007 | Roberts et al. ............. 345/204 |
| 7,256,923 | B2 | 8/2007 | Liu et al. |
| 7,300,166 | B2 | 11/2007 | Agrawal et al. |
| 7,382,237 | B2 * | 6/2008 | Stoschek et al. ........... 340/438 |
| 2002/0080290 | A1 | 6/2002 | Nihei |
| 2002/0118437 | A1 | 8/2002 | Rukavina et al. |
| 2002/0135881 | A1 | 9/2002 | Rukavina et al. |
| 2002/0196518 | A1 | 12/2002 | Xu et al. |
| 2002/0196519 | A1 | 12/2002 | Elkadi et al. |
| 2003/0047457 | A1 | 3/2003 | Rukavina et al. |
| 2003/0174377 | A1 | 9/2003 | Reynolds et al. |
| 2003/0184692 | A1 | 10/2003 | Nagae |
| 2003/0192991 | A1 | 10/2003 | Rukavina et al. |
| 2003/0209893 | A1 | 11/2003 | Breed et al. |
| 2003/0233172 | A1 | 12/2003 | Granqvist et al. |
| 2004/0001056 | A1 | 1/2004 | Atherton et al. |
| 2004/0021928 | A1 | 2/2004 | Warner et al. |
| 2005/0068629 | A1 | 3/2005 | Fernando et al. |
| 2005/0200933 | A1 | 9/2005 | Weidner |
| 2005/0200934 | A1 | 9/2005 | Callahan et al. |
| 2005/0200937 | A1 | 9/2005 | Weidner |
| 2005/0270619 | A1 | 12/2005 | Johnson et al. |

FOREIGN PATENT DOCUMENTS

| | | |
|---|---|---|
| EP | 1158336 | 11/2001 |
| GB | 2368403 | 5/2002 |
| JP | 2002104017 | 4/2002 |
| JP | 2004003135 | 1/2004 |

OTHER PUBLICATIONS

"Electrochromism", retrieved on Jun. 15, 2006 at <<http://en.wikipedia.org/w/index.php?title=Electrochromism&oldid=53466702>>, Wikipedia, The Free Encyclopedia, Wikimedia Foundation, Inc., May 16, 2006.

"InspecTech Aero Service Acquires License From Research Frontiers to Produce SPD Aircraft Windows Which Save Energy, Reduce Costs of Operation, and Promote Passenger Comfort", retrieved on Jun. 15, 2006 at http://www.findarticles.com/p/articles/mi_m0EIN/is_2001_March_22/ai_72047362>>, Business wire, business, Airline and Aerospace Editors, Mar. 22, 2001, pp. 1-4.

Liu, et al., "Design of Smart Window based on Electrochromic Polymers: New Derivatives of 3,4-alkylenedioxythiophene", electroactive Polymer Actuators and Devices (EAPAD), edtied by Bar-Cohen, Y., Proceedings of the SPIE, vol. 5385, pp. 454-460, (Jul. 2004).

Sapp et al.,"High Contrast Ratio and Fast-Switching Dual Polymer Electrochromic Devices", 1998, Chem. Mater, 10:2101-2108.

Schwendeman, et al., "Combined Visible and Infrared Electrochromism Using Dual Polymer Devices", 2001, Advanced Materials 13:9, pp. 634-637.

"Smart Windows", retrieved on Jun. 15, 2006 at <<http://em.wikipedia.org/w/index.php?title=Smart_windows&oldid=57591898>>, Wikipedia, The Free Encyclopedia, Wikimedia Foundation, Inc., Jun. 8, 2006.

Welsh, et al., "Enhanced Contrast Ratios and Rapid Switching in Electrochromics Based on Poly (3,4-propylenediozythiophene) Derivitives", Advanced Materials 11:16, 1379-1382.

Xu, et al., "Enhanced Smart Window Based on Electrochromic Polymers", Smart Structures and Materials 2003, Electroactive Polymer Actuators and Devices (EAPAD), edited by Bar-Cohen, Y., Proceedings of the SPIE, vol. 5051, pp. 404-411 (Jul. 2003).

Legenski, Xu et al., "Gel Electrolyte Candidates for Electrochromic Devices (ECD)", Smart Structures and Materials 2004, Electroactive Polymer Actuators and Devices (EAPAD), edited by Bar-Cohen, Y., Proceedings of the SPIE, vol. 5385, pp. 319-325, (Jul. 2004).

PCT Invitation to Pay Additional Fees for Application No. PCT/US2008/053752, dated Jun. 6, 2008, 6 pgs.

* cited by examiner

ELECTRICALLY DIMMABLE COMBINER OPTICS FOR HEAD-UP DISPLAY

CROSS REFERENCE TO RELATED APPLICATIONS

This patent application is related to co-pending, commonly-owned U.S. patent application Ser. No. 11/383,372 entitled "Systems and Methods for Controlling Windows with Variable Light Transmission," filed on May 15, 2006, which application is hereby incorporated by reference.

FIELD OF THE INVENTION

The invention relates generally to head-up displays, and more specifically to methods and systems for providing head-up displays with variable light transmission.

BACKGROUND OF THE INVENTION

A head-up display (HUD) is a display surface that is substantially transparent and allows a user to look through the HUD and view information presented on the surface of the HUD, including the outside environment, without refocusing the user's eyes. Aircraft and motor vehicles typically utilize one type of HUD, called a fixed HUD, which allows the HUD to depict information relative to the orientation of the aircraft or vehicle. Another type of HUD is a moveable HUD, which is often mounted in a helmet or head-mounted visor. A moveable HUD can display similar elements, but corrects the positions of the image by sensing the movement of a person's head or body so that the images are still stable with respect to the outside world.

Military and commercial cockpits or flight decks have employed head-up displays for decades. HUD's have also migrated into many other applications including motorized vehicles. In aviation, with the exception of specific pilot tasks (e.g., targeting), HUD's are generally used to provide the pilot with flight instrument information such as airplane attitude, airspeed, altitude, flight path, and other information while the pilot's attention is focused outside of the aircraft. In a typical installation, a HUD projector projects an image onto an optical transparent "combiner". The pilot or operator views the outside world through the transparent combiner, and the optical qualities of the combiner and the projector work together to focus the displayed image in a far field (e.g., focal point well outside the aircraft) as viewed by the pilot through the combiner, so that the pilot can view information and the outside world at the same time without re-focusing his or her eyes. The image appears to the operator to be projected onto the outside world. Aircraft also generally include primary flight displays installed on the main instrument panel in front of the pilot for use during head-down instrument flying.

Because of limitations inherent in existing HUD's, regulators do not usually approve HUD's as the sole source of aircraft display information for maintaining awareness of critical parameters and controlling the airplane. One drawback of existing HUD's is the difficulty to read data on a HUD under bright conditions, such as when the sun is near the horizon and appears in or near the HUD from the pilot's viewpoint. Additionally, when pilots are flying through or near brightly sunlit clouds, it may be difficult or impossible to read data presented on a HUD. For this reason, a HUD cannot be certified as the sole display on an aircraft for critical flight parameters such as attitude, altitude, airspeed, or heading.

Therefore, there exists a need for improved apparatuses and systems for providing head-up displays.

SUMMARY

Embodiments of methods and systems for providing head-up displays are disclosed. Embodiments of methods and systems in accordance with the present disclosure may advantageously improve operation and reliability of head-up displays, and thus provide a user with a greater opportunity to utilize the HUD to receive information.

In one embodiment, a dimmable head-up display includes a display portion configured to provide head-up display information to an operator. Additionally, a dimmable portion is coupled to the display portion configured to change a transmissivity of the display portion from a first transmissivity level to a second transmissivity level.

In another embodiment, a system for providing a dimmable head-up display includes a dimmable combiner configured to provide head-up display information to an operator, the dimmable combiner adjustable from a substantially transparent level to a less transparent level, a light sensor configured to detect the light intensity of an environment surrounding the dimmable combiner, and a combiner control module configured to receive a light sensor signal from the light sensor and transmit a control signal to the dimmable combiner for adjusting the transmissivity of the dimmable combiner.

In a further embodiment, a method for providing a dimmable head-up display includes receiving an input from an operator, measuring a light intensity from a light sensor, and adjusting the transmissivity of a dimmable head-up display utilizing one of the input from the operator and the light intensity measured by the light sensor.

The features, functions, and advantages can be achieved independently in various embodiments of the present inventions or may be combined in yet other embodiments.

BRIEF DESCRIPTION OF THE DRAWINGS

Embodiments of the invention are described in detail below with reference to the following drawings.

DETAILED DESCRIPTION

Methods and systems for providing an electrically dimmable combiner optics for head-up displays are described herein. Many specific details of certain embodiments of the invention are set forth in the following description and in FIGS. 1 through 8 to provide a thorough understanding of such embodiments. One skilled in the art, however, will understand that the present invention may have additional embodiments, or that the present invention may be practiced without several of the details described in the following description.

Embodiments of methods and systems in accordance with the invention may provide considerable advantages over the prior art. For example, in a situation where too much outside light reaches an operator's eyes, embodiments of the invention may reduce or replace the need for visors, sun shades, and sunglasses, prevent or reduce squinting, and reduce the risk of loss of visual acuity. Where the light intensity increases too quickly, embodiments of the invention may prevent or mitigate undesirable effects on the operator by reducing the maximum light intensity and consequently the undesirable effects of a rapid change in outside light intensity experienced by the operator, such as a pilot. Throughout this disclosure, the term 'dimmable' may be interchangeable with variable light transmission, such as variable light transmission through a variably transparent object.

Figure 1:
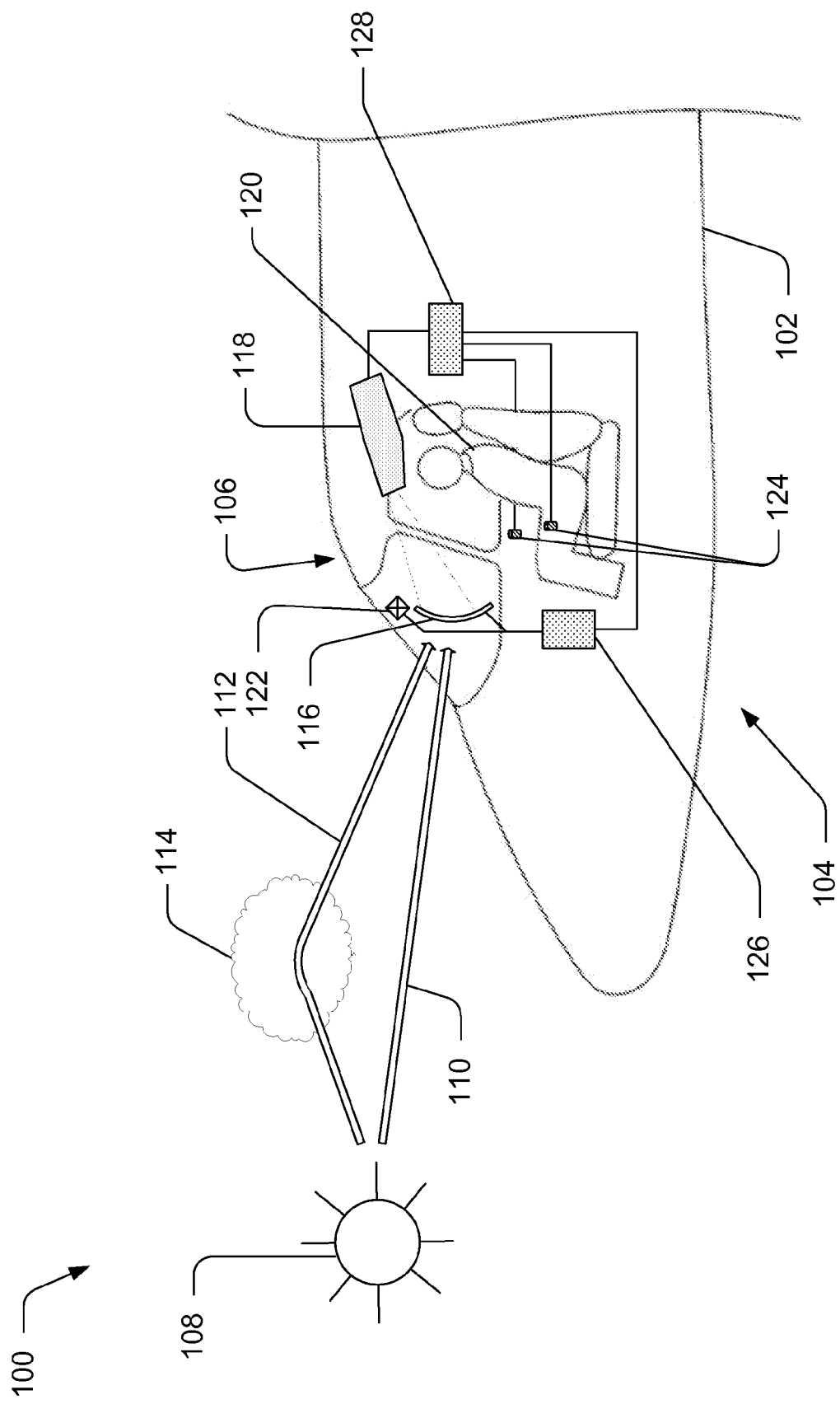
FIG. 1 is a side, partial elevational schematic view of an aircraft having a cockpit portion that includes a dimmable head-up display in accordance with an embodiment of the invention.

FIG. 1 is a side, partial elevational schematic view of an aircraft 102 having a cockpit portion 104 that includes a dimmable head-up display (HUD) 106 in accordance with an embodiment of the invention. As shown in an environment 100 in FIG. 1, light from the sun 108 may enter the cockpit portion 104 in several ways. A direct portion 110 may shine directly into the cockpit portion 104 from the sun 108, while an indirect portion 112 may reflect from a cloud 114 or other reflective object into the cockpit portion 104.

In an embodiment, the HUD 106 includes a combiner 116 and a projector 118. The projector 118 projects an image on the combiner 116, such as vehicle information. In other embodiments, the HUD 106 may display images on a combiner 116 without a projector 118. For example, the combiner 116 may have an internally integrated display module. When the system is on or excited, the operator 120 may view images, graphics, and other information presented by the internally integrated display module or the projector 118. The operator 120 may view images through the combiner 116, such as the outside environment of the vehicle, when the combiner is at least partially transparent.

The combiner 116 is typically an optical glass or plastic device that allows the operator 120 to see through the combiner 116 to monitor outside activities. The operator 120 sees HUD images, such as vehicle information, focused outside the vehicle by looking through the combiner 116. For example, the combiner 116 may display information to allow an operator 120 (e.g., pilot) to view flight control information, such as altitude, airspeed, and horizon orientation, while also allowing the operator 120 to see outside the aircraft 102 through the combiner 116. Therefore, the operator 120 can shift his attention between flight control information presented by the HUD 106 and external activity outside of the aircraft 102 without refocusing his eyes.

The combiner 116 generally includes at least one variable transmissivity portion. The dimmability (or variable transmissivity) of the combiner 116 may be provided in any suitable manner. For example, in alternate embodiments, the combiner 116 may include an electrochromic, a gel-type (e.g. Gentex™), a thin-film (e.g. St. Gobian™ or Sully™), a photochromic, or any other suitable technology that provides variably controllable light transmission levels. More specifically, in alternate embodiments, the combiner 116 may include any of those electrochromic devices, materials, and systems generally disclosed in U.S. Patent Application Publication No. 2002/0196518 entitled "Electrochromic Organic Polymer Syntheses and Devices Utilizing Electrochromic Organic Polymers", filed on Jun. 25, 2002, and in the following co-pending, commonly-owned U.S. Patent Applications filed on Oct. 27, 2004: US Patent Application Publication No. 2005/0200934 entitled "Dimming Control System for an Array of Electrochromic Devices", U.S. Patent Application Publication No. 2005/0200933 entitled "Low Vapor Pressure Solvent for Electrochromic Devices", and U.S. Patent Application Publication No. 2005/0200937 entitled "Multi-Color Electrochromic Apparatus and Methods", which applications are hereby incorporated by reference. In this manner, the combiner 116 includes dimmable or variably controllable transmissivity.

The variably controllable transmissivity of the combiner 116 enables the operator 120 to view the HUD 106 display regardless of ambient brightness or sun position, while still maintaining the transparent capabilities of the HUD 106. Additionally, the dimmable combiner 116 may function as a sunshade in lieu of tinted and movable plastic shades.

With continued reference to FIG. 1, the HUD may also include operator controls 124 to adjust the transmissivity of the combiner 116 or the display characteristics of the combiner 116 via the projector 118 or other display source. In other embodiments, the HUD 106 may include a light sensor 122. The light sensor 122 may detect the light intensity outside the cockpit portion 104 and transfer this information to an operatively coupled combiner control device 126 in connection to the combiner 116. The control device 126 may adjust the transmissivity of the combiner 116 after receiving information relating to the light sensor 122 detection of the light intensity. Additionally, the operator controls 124 may allow the operator 120 to manually control the transmissivity of the combiner 116 based on preferences of the operator 120. Similarly, a projector control device 128 may receive input from the light sensor 122 and the operator controls 124 to adjust the display characteristics (e.g., brightness) of the image projected onto the combiner 116 via the projector 118. In further embodiments, the control devices 126, 128, may utilize both manual and automatic controls in combination.

Figure 2:
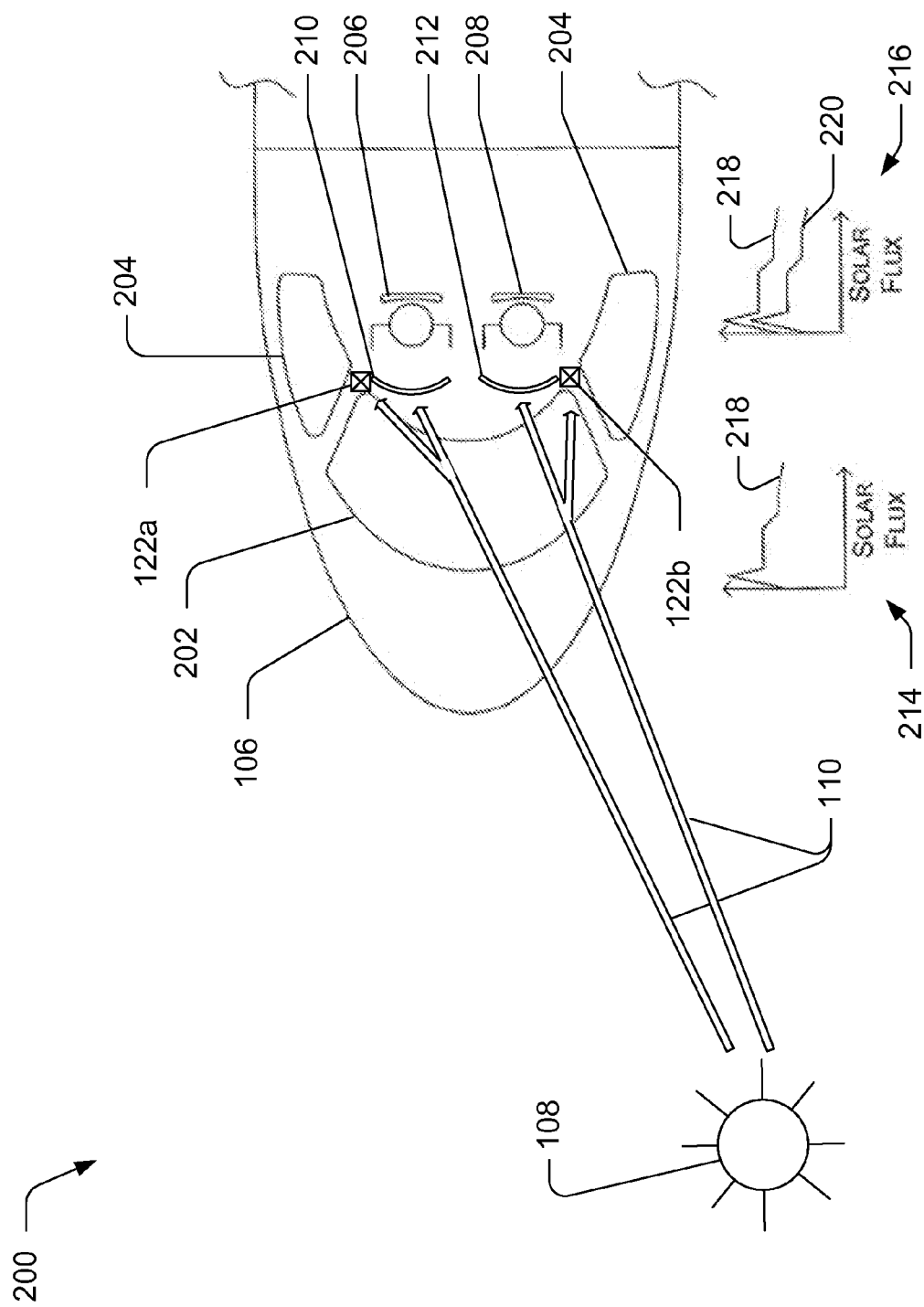
FIG. 2 is a top, partial sectional view of a cockpit portion of the aircraft of FIG. 1, including a dimmable head-up display.

FIG. 2 is a top, partial sectional view of an environment 200, including the cockpit portion 104 of the aircraft 102 of FIG. 1 having the dimmable HUD 106. In this embodiment, the cockpit portion 104 includes a front (or main) window 202 and a pair of side windows 204. A first pilot (or captain) 206 is positioned on a first side of the cockpit portion 104, and a second pilot (or co-pilot) 208 is positioned on a second side of the cockpit portion 104. The first pilot 206 may have a first combiner 210 positioned between the first pilot 206 and the front window 202. The second pilot 208 may have a second combiner 212 positioned between the second pilot 208 and the front window 202. The cockpit portion 104 includes light sensor 122a, 122b to detect the intensity of light from outside the cockpit portion 106, such as by the sun 108 by direct or reflected sunlight 110. In one embodiment, two light sensors 122a, 122b may be utilized, each detecting light for a corresponding combiner 210, 212, respectively. In other embodiments, one centrally located light sensor, such as light sensor 122, may detect the light for all combiners, such as combiners 210, 212.

In some embodiments, the combiners 210, 212 include an electrically dimmable portion. For example, when light passes through the combiners 210, 212, the electrically dimmable portion reduces the light transmissivity, and thus reduces the intensity of the light. Therefore, the pilots 206, 208 may utilize the combiners 210, 212 in bright sunlight conditions instead of relying on head-down displays, such as those typically relied upon for instrument-based navigation or control.

A first solar flux graph 214 and a second solar flux graph 216 are presented to further illustrate the light intensity before and after light passes through the combiners 210, 212. The first solar graph 214, with line 218, represents the amount of light received from the sun before the light reaches the combiners 210, 212. The second solar graph 216, with line 220, represents the amount of light received from the sun after the light passes through the combiners 210, 212. For example, in the solar graphs 214, 216, the abscissa represents time (t) while the ordinate represents the solar flux (f). As illustrated, the transmissivity filtering of the combiners 210, 212 reduces the solar flux in the second graph 216. Therefore, the combiners 210, 212 may be utilized by the pilots 206, 208 in conditions with direct sunlight or bright outside ambient conditions because the pilots 206, 208 may decrease the transmissivity of the combiners to reduce the solar flux passing through the combiner.

Figure 3:
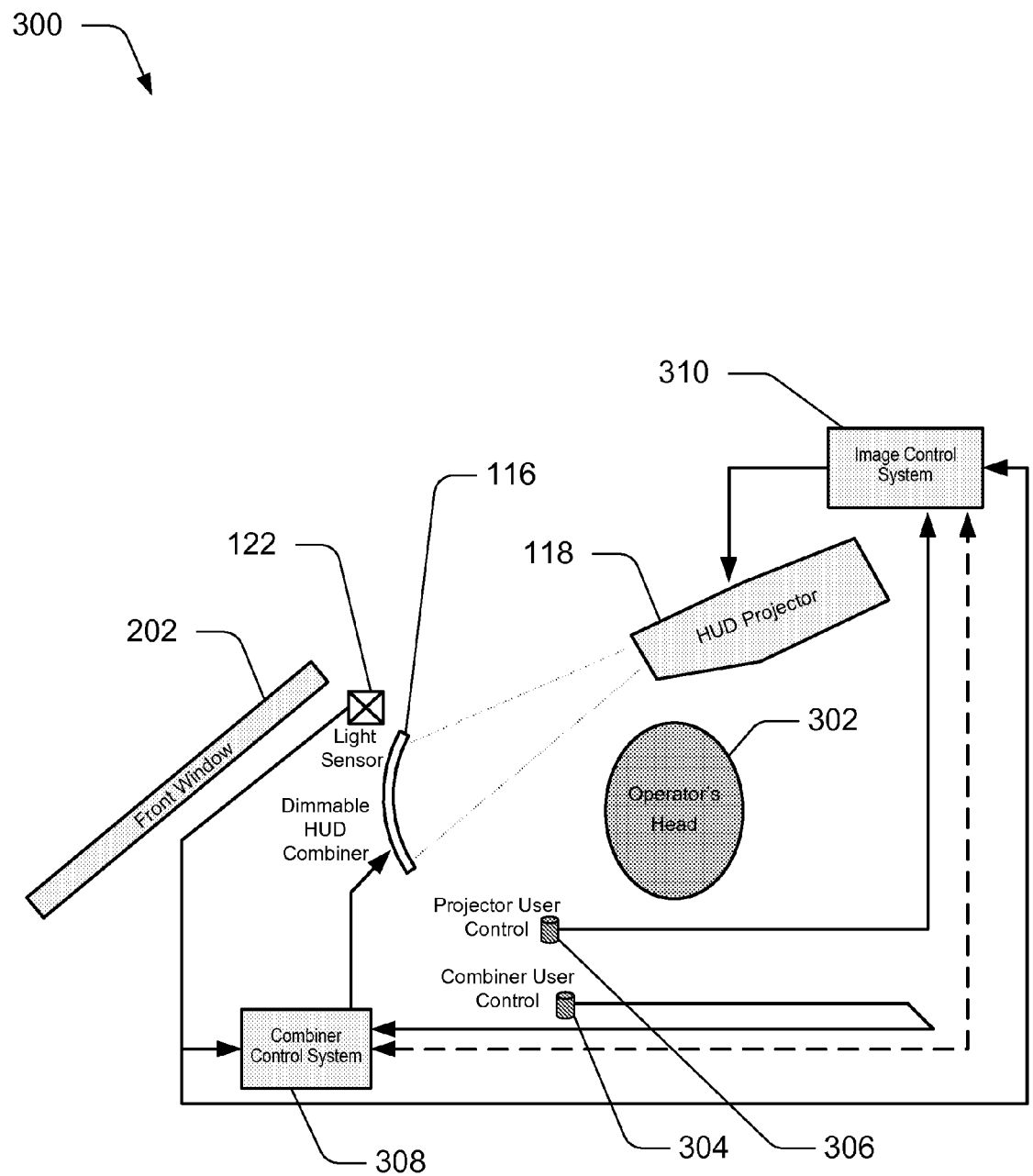
FIG. 3 is a schematic of a dimmable head-up display in accordance with another embodiment of the invention.

FIG. 3 is a schematic of a dimmable head-up display 300 in accordance with another embodiment of the invention. The combiner 116 is configured between the front window 202 and an operator's head 302. The combiner 116 includes an electrically dimmable layer. The combiner 116 may receive an image from the projector 118 to provide information to the operator 302. Alternatively, the combiner 116 may include an internally integrated display module. The head-up display 300 may also include a light sensor 122 and operator input devices 304, 306.

With continued reference to FIG. 3, the light sensor 122 may be configured to measure the intensity of light, such as from the direct light 110. In turn, the combiner control system 308 receives the information from the light sensor 122. The combiner control system 308 may also receive a transmission level preference from an operator via an operator dimming input device 304. The combiner control system 308 may automatically maintain or adjust the transmission level of one or more combiner portions of the combiner 116 in accordance with the desired transmission level from the light intensity measurements from the light sensor 122 and the operator dimming input device 304. In one particular embodiment, the combiner control system 308 adjustably controls the transmissivity of the combiner 116 by varying a voltage value provided by a power source (not shown) to one or more variably controllable transmissivity portions of the combiner 116. In another alternate embodiment, the combiner control system 308 may eliminate the user inputs from the dimming user input device 304.

In other embodiments, the head-up display 300 may include the operator projector input device 306, as presented above, and a HUD projector image control system 310. The image control system 310 may adjust the projection's brightness, contrast, or other projection attributes to improve the resulting display on the combiner 116. For example, when the combiner 116 reduces transmissivity because of bright conditions, it may be desirable to adjust the contrast of the image presented on the combiner 116 by the projector 118 by adjusting the projector input device 306. In other embodiments, the image control system 310 may be in operable connection with the light sensor 122. The light sensor may detect changes in the light intensity and communicate the light intensity changes to the image control system 310, which may then adjust the display on the combiner 116. In still further embodiments, the image control system 310 may be in operable connection with the operator dimming input device 304, therefore enabling the image control system 310 to adjust the projection attributes in response to dimming of the combiner via operator 302 input from the operator dimming input device 304.

In still further configurations of the head up display 300, the image control system 310 may be in communication with the combiner control system 308. The combiner control system 308 may send the image control system 310 a signal when the combiner control system 308 changes the transmissivity of the combiner 116, therefore allowing the image control system 310 to make adjustments to the projection of images on the combiner 116. The image control system 310 may also send a signal to the combiner control system 308, such as to communicate a change to the image display setting of the combiner 116. As discussed above, the images may be presented on the combiner by other means than a projector, such as by internally integrated display modules, which may also be in communication with the image control system 310 and operate in accordance with the head-up display 300, including the projector 118 immediately above. In some embodiments, the combiner control system 308 and image control system 310 may be combined into a single control system.

Figure 4:
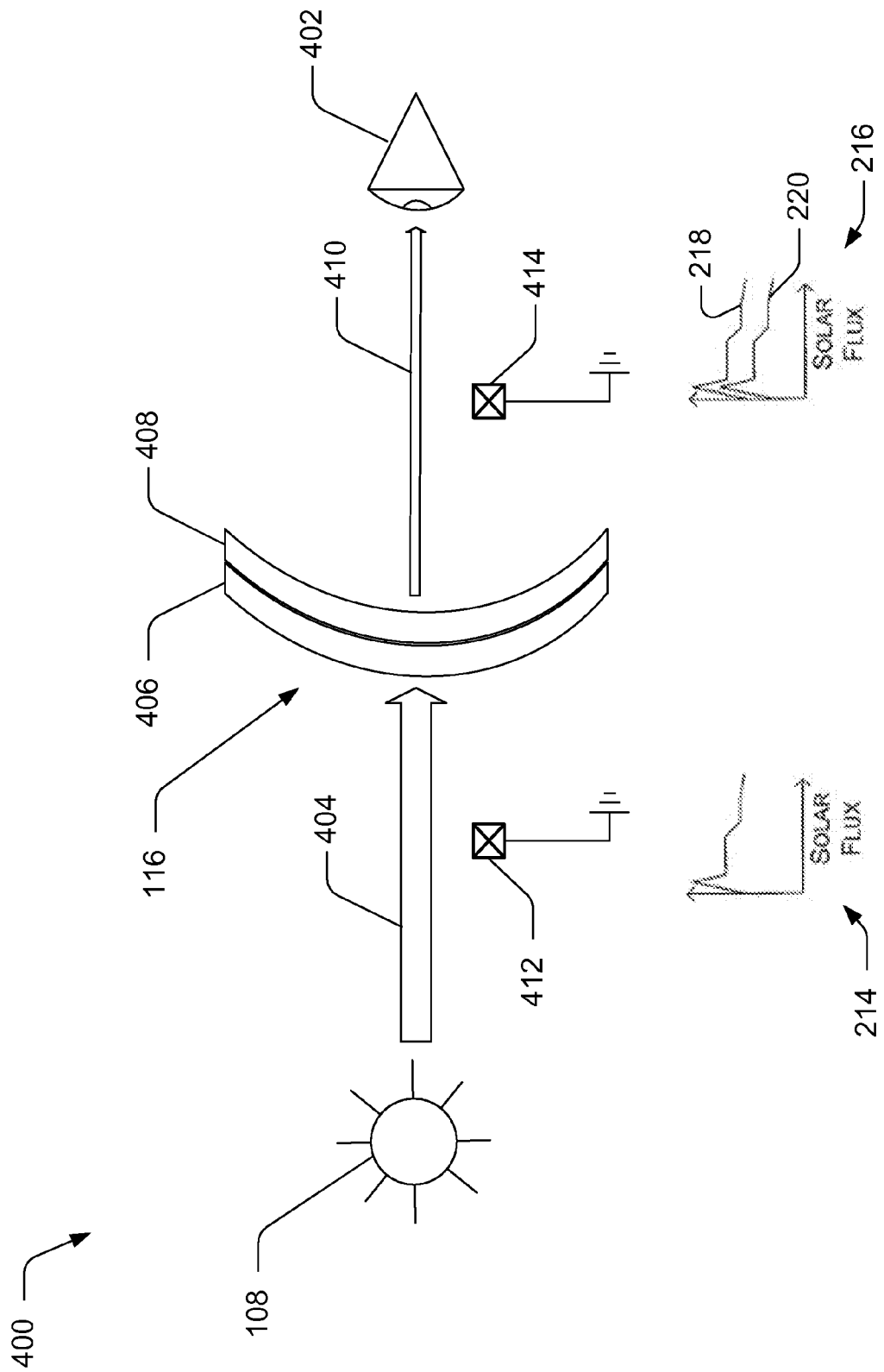
FIG. 4 is a schematic of a dimmable head-up display in accordance with another embodiment of the invention.

FIG. 4 is a schematic of a dimmable head-up display 400 in accordance with another embodiment of the invention. The combiner 116 is configured between a viewing point 402 (such as a view from an operator's perspective) and the light source, such as the sun 108. Light 404 from the sun 108 intersects the combiner 116. The combiner 116 includes a dimmable portion 406 and a display portion 408. The resulting light 410 reaches the viewing point 402 after passing through the combiner 116. The light 404 may include the solar flux 214 while the resulting light 410 may include the solar flux 216, depending on the transmissivity setting of the combiner 116 resulting from activation of the dimmable portion 406.

As noted above, the dimmable portion 406 may be an electrochromic, a gel-type (e.g. Gentex™), a thin-film (e.g. St. Gobian™ or Sully™), or any other suitable technology that provides variably controllable light transmission levels. In other embodiments, the dimmable portion 406 may be photochromic, and thus undergo a chemical reaction when the dimmable portion is exposed to ultraviolet (UV) radiation. In other embodiments, it may be desirable to combine two or more of the above dimmable portions to reduce the transmissivity of light through the combiner 116.

The display portion 406 may be configured for displaying imagery from a projector or from an internally integrated display module. For example, in an embodiment, the display portion 408 may be an internally integrated display module display integrated into the combiner 116. The internally integrated display module may require additional layers or portions within the display portion to produce head-up display images for viewing by an operator 402.

The HUD 400 may include a first light sensor 412 and a second light sensor 414. The first light sensor 412 may be disposed between the combiner 116 and the sun 108, or adjacent to the combiner 116, such as above or below the combiner 116. Therefore, the first light sensor 412 detects the light intensity before the light 404 passes through the combiner 116. The second light sensor 414 is disposed between the combiner 116 and the operator 402. Therefore, the second light sensor 414 detects the light intensity after the light (i.e., resulting light 410) passes through the combiner 116. In some embodiments, the HUD may only include one of the light sensors 412, 414.

The first light sensor 412 may provide a fixed relationship between the outside brightness and the degree of dimming of the combiner 116. For example, the first light sensor 412 may be calibrated to adjust the transmissivity of the combiner 116 to a substantially transparent state when the first light sensor 412 detects a low intensity of light. When the first light sensor 412 detects a high intensity of light, the first light sensor 412 may restrict the transmissivity of the combiner 116 to reduce the light intensity viewed by the operator 402.

The second light sensor 414 may provide a closed loop control system, which adjusts the dimming of the combiner 116 based on the light intensity the second light sensor 414 detects from the resulting light 410 after it passes through the combiner 116. For example, the second light sensor 414 may calibrate the transmissivity of the combiner 116 by periodically sensing the light intensity, and then adjusting the transmissivity according the measured light intensity. Therefore, the second light sensor 414 may receive a relatively constant light intensity level through the combiner 116 by continually adjusting the transmissivity of the combiner 116.

In a further embodiment of the dimmable HUD 400, the second light sensor 414 measures interior light intensity measurements, and the combiner control system 308, as shown in FIG. 3, automatically maintains the transmission levels of the one or more combiner portions of the combiner 116 at suitable transmission levels unless the desired transmission level renders the interior light intensity measurements below a predetermined (or minimum desired) threshold. When the desired transmission level results in the light intensity measurements being below the certain threshold, the combiner control system 308 adjusts (e.g., increases) the transmission level of one or more combiner portions of the combiner 116 to any level that results in the light intensity measurements being at or above the certain threshold. The combiner control system 308 may periodically or continuously evaluate the light intensity measurements provided by the second light sensor 414, and may periodically or continuously adjust the transmission level of the combiner 116 when the light intensity measurements fall below the certain threshold.

In another embodiment, the combiner control system 308 may be further adapted to adjust the transmissivity of the combiner 116 based on a second predetermined threshold, such as, for example, a maximum allowable (or maximum desired) light intensity measurement. More specifically, the second light sensor 414 may measure a light intensity (e.g. within the structure) that exceeds a maximum desired threshold. When the combiner control system 308 determines that the measured light intensity has exceeded the maximum desired threshold, the combiner control system 308 may automatically adjust (e.g., decrease) the transmissivity of one or more combiner portions of the combiner 116 to lower the measured light intensity. In a particular embodiment, a vehicle, such as a cockpit of an aircraft, may employ the head-up display 400 and use it to provide protection to the pilot (or other vehicle operator) from a high intensity light or laser.

In yet another embodiment, the head-up display 400 may be configured with a fail-safe mechanism. In this embodiment, if any component of the head-up display 400 experiences a problem, the fail-safe mechanism (e.g., a component of the combiner control system 308) may automatically default the transmission level of the combiner 116 to a predetermined acceptable level. In some embodiments, such as in a cockpit of an aircraft, the predetermined acceptable level may be a relatively high transmission level that provides normal, non-attenuated visibility levels to the operator 302. In alternate embodiments, however, the fail-safe mechanism may result in reduced transmissivity, in comparison with a normal, non-attenuated visibility level. In further embodiments, the dimmable combiner 116 may be movably configured in front of an operator 302. For example, the combiner 116 may move outside of the operator's line of sight through the front window 202 if the dimmable combiner fails to operate properly, therefore giving the operator an unobstructed view through the front window 202.

Figure 5:
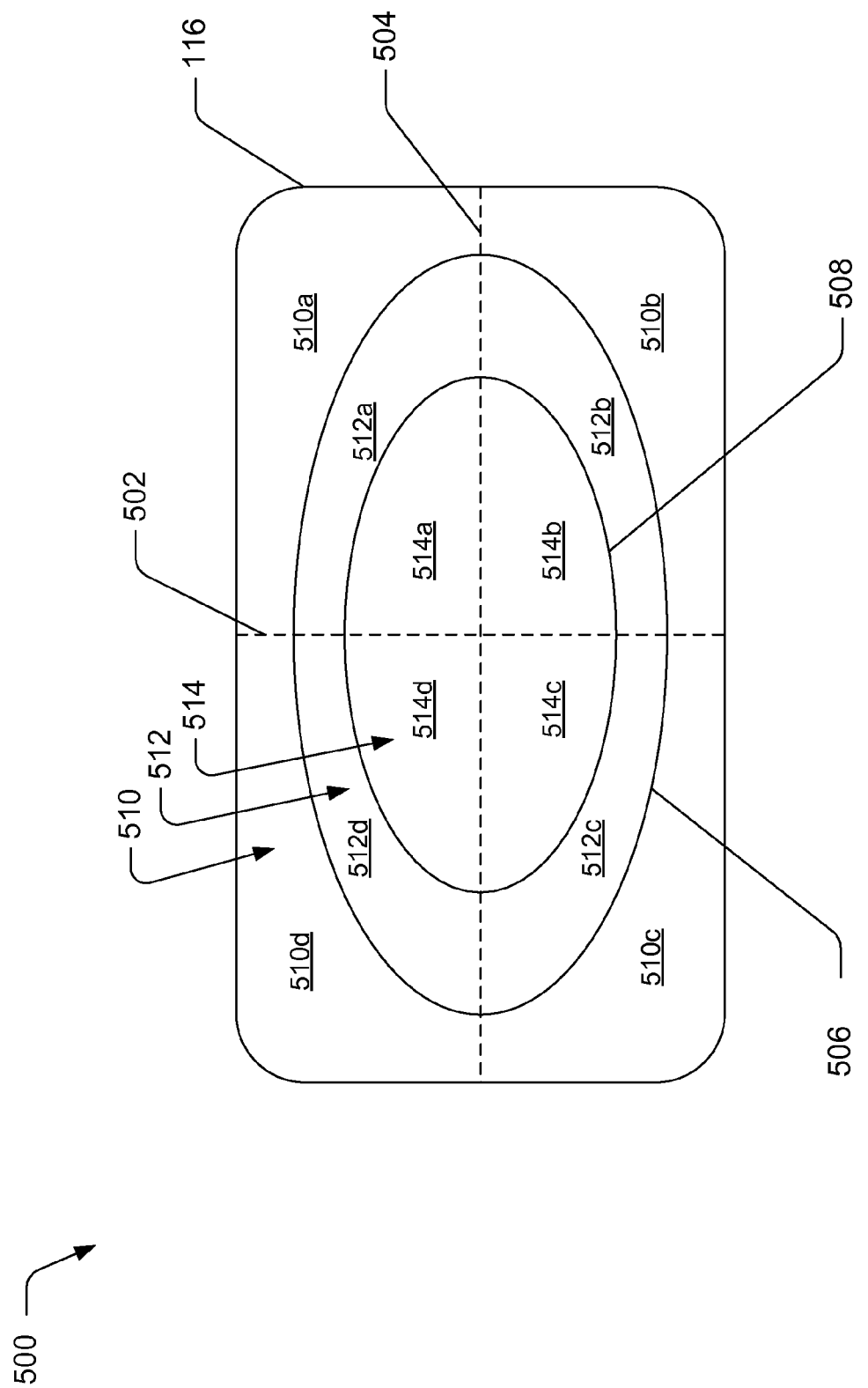
FIG. 5 is a schematic of a segmented dimmable head-up display in accordance with an embodiment of the invention.

FIG. 5 is a schematic of a segmented dimmable head-up display 500 in accordance with an embodiment of the invention. In some embodiments, the combiner 116 may include one or more segments to provide varying levels of transmissivity of light through different segments of the combiner 116. For example, the combiner 116 may be divided vertically 502, horizontally 504, or both to create segments of the combiner 116.

In some embodiments, the combiner may be segmented by an outer segmenting parameter 506 and an inner segmenting parameter 508. It may be advantageous to position the segmenting parameters 506, 508 to reduce the light intensity from specific areas of the combiner 116, such as the outer segment 510, including sub-segments 510a-510d, while maintaining more transmissivity in an intermediary segment 512 or inner segment 514. Further, each segment 510, 512, 514 may be subdivided horizontally, vertically, or both to form corresponding sub-segments 510a-510d, 512a-512d, 514a-514d, respectively. Segmenting the combiner 116 may include utilizing fewer or more segmenting parameters. For example, a segment, such as segment 510, 512, 514, may include any number of sub-segments. Additionally, the configuration of segmenting parameters may be configured in any number of patterns, including elliptical segments, rectangular segments, circular segments, or other segment forms or shapes.

Each segment may be configured to provide adjustable transmissivity of light through the combiner 116. For example, the outer segment 510 may be configured to provide a different transmissivity of light through the combiner 116 that the transmissivity of light through the intermediate segment 512 or inner segment 510. Further, each segment may be controlled automatically, such as by the combiner control system 308 (FIG. 3) or by one or more operator input devices 306.

Figure 6:
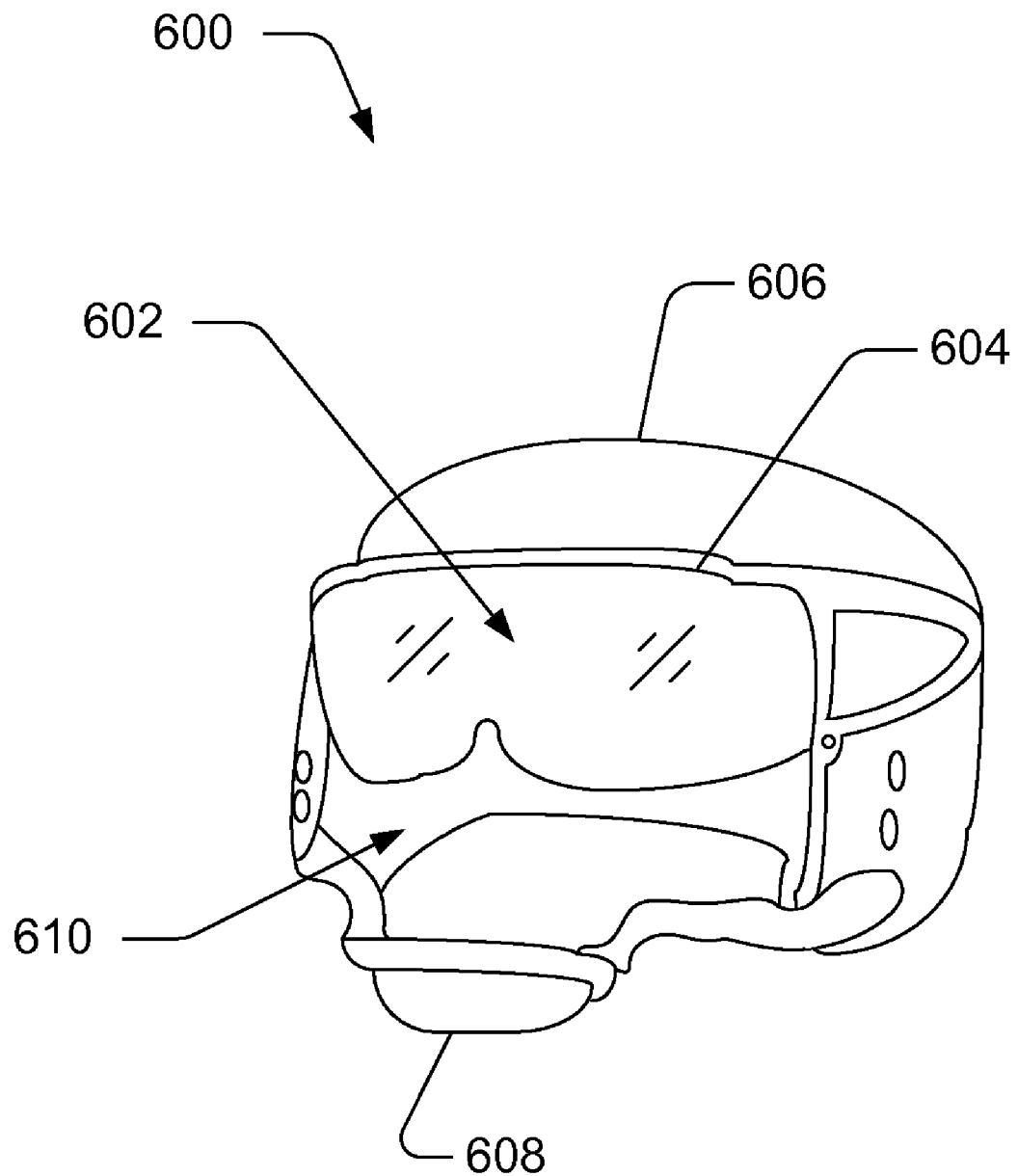
FIG. 6 is an isometric view of a head-mountable dimmable head-up display in accordance with another embodiment of the invention.

FIG. 6 is an isometric view of a head-mountable dimmable head-up display 600 in accordance with another embodiment of the invention. In some embodiments, the combiner 602 may be wearable, such as in the form of a visor 604 configured with a helmet 606. For example, the helmet 606 may be an aviator helmet including a chinstrap 608 and protective cushioning 610. In other embodiments, the HUD 600 may be configured without a helmet 606, such as in a pair of glasses or a mountable head visor. The HUD 600 may include internally integrated display modules to display information to an operator. The combiner 602 may include at least one variable transmissivity portion of the combiner 116. Smaller sub-segments may also segment the transmissivity portion. The combiner 602 may be controlled automatically, such as by the combiner control system 308 (FIG. 3) or by one or more operator input devices 306.

Figure 7:
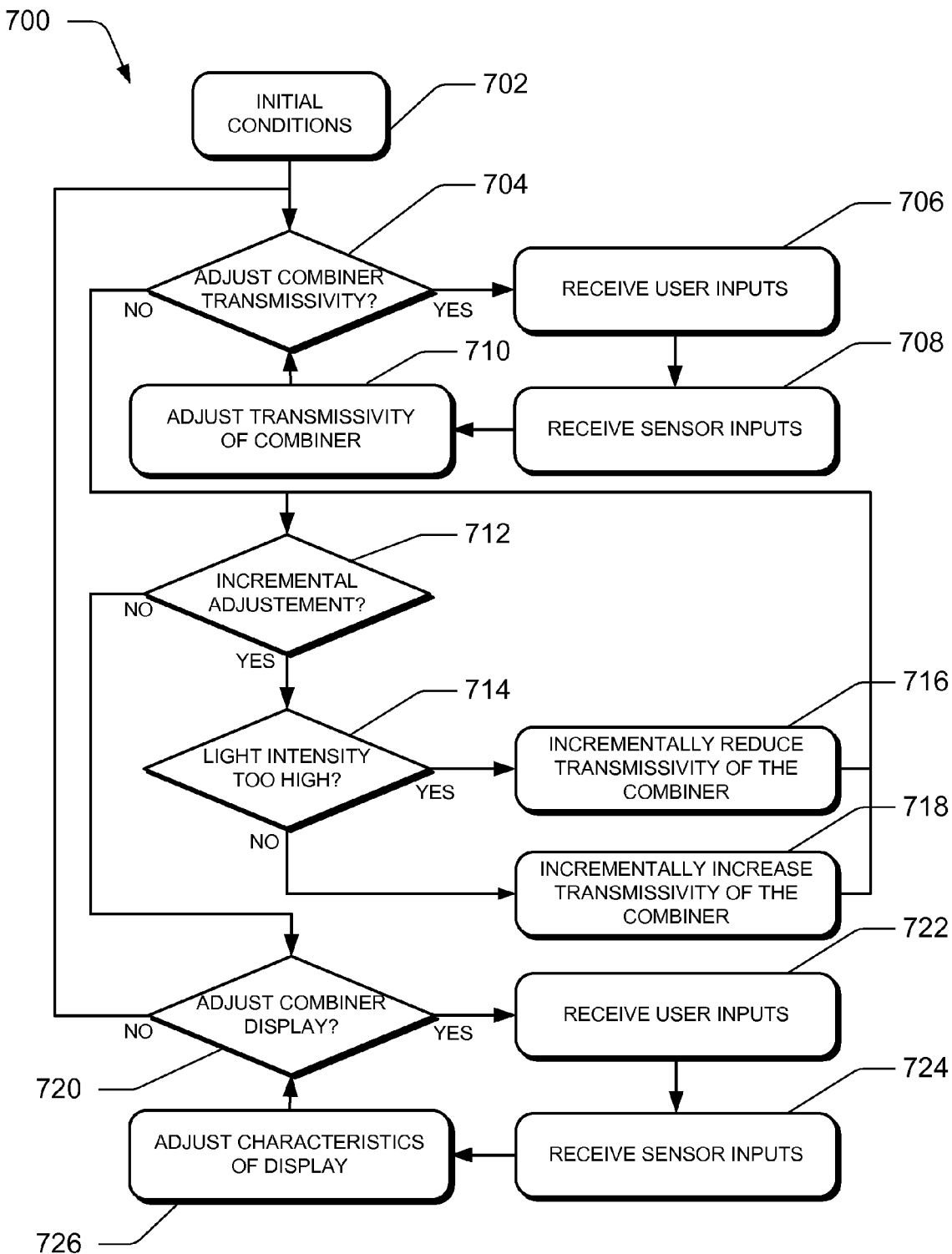
FIG. 7 is a flow diagram of a system for providing a dimmable head-up display in accordance with embodiments of the invention.

FIG. 7 is a flow chart for a system (or method) 700 for providing a dimmable head-up display in accordance with embodiments of the invention. In this embodiment, the system 700 begins at a state of initial conditions at a block 702. At a decision block 704, the system 700 determines whether to adjust the transmissivity of the combiner to increase or reduce the light intensity viewable through the combiner. If the system 700 selects adjusting the transmissivity of the combiner at the decision block 704, at a block 706, the system receives one or more user inputs from the operator input device 304. At a block 708, the combiner control system 308 receives one or more sensor inputs from the light sensor 122. At a block 710, the system 700 adjusts the transmissivity of the combiner utilizing information from the blocks 706, 708, or both. If the system 700 does not select adjusting the transmissivity of the combiner at the block 704, the system proceeds to a decision block 712.

At the decision block 712, the system 700 makes a determination whether to adjust the transmissivity of the combiner incrementally. For example, at the decision block 712, the system 700 may implement a calibration algorithm to fine tune the transmissivity of the combiner. If the system 700 selects an incremental adjustment, at a decision block 714, the system determines whether the light intensity is too high. If so, then at a block 716, the system 700 incrementally reduces the transmissivity of the combiner 116 if the combiner is not already at a minimum allowable level, and then the system returns to block 714. Alternately, if the light level is not too high (block 714), the light level is deemed to be too low, and the transmissivity of combiner 116 is incrementally increased provided that the combiner is not already at a maximum level, and then the system returns to the decision block 712.

If the system 700 does not select an incremental adjustment at the decision block 712, at a decision block 720, the system determines whether to adjust the combiner display. For example, the combiner display produced by the projector 118 may be difficult to see when the system adjusts the transmissivity of the combiner 116 at the block 710. Therefore, it may be desirable to adjust the contrast, brightness, or other display characteristics of the combiner display to allow an operator to view the displayed information easier. If the system 700 selects adjusting the display characteristics of the combiner 116 at the decision block 720, at a block 722, the system receives one or more user inputs from the operator input device 306. At a block 724, the image control system 310 receives one or more sensor inputs from the light sensor 122. At a block 726, the system 700 adjusts the display characteristics of the combiner 116 utilizing the information from the blocks 722, 724, or both. If the system 700 does not select adjusting the display characteristics of the combiner at the decision block 720, the system may reiterate to the decision block 704.

Although the system 700 makes general reference to a combiner 116, one should appreciate that embodiments of the system 700 may apply to segments or sub-segments of the combiner. For example, with reference to FIG. 5, the system 700 may separately adjust the segments 510, 512, 514, or it may adjust them in combination to create the desirable level of transmissivity at the block 710.

Generally, any of the functions described herein can be implemented using software, firmware (e.g., fixed logic circuitry), hardware, manual processing, or any combination of these implementations. In the case of a software implementation, the module, functionality, or logic described herein represents program code that performs specified tasks when executed on processor(s) (e.g., any of microprocessors, controllers, and the like). The program code can be stored in one or more computer readable memory devices. Further, the features and aspects described herein are platform-independent such that the techniques may be implemented on a variety of commercial computing platforms having a variety of processors.

It will also be appreciated that methods and systems in accordance with the teachings of the present disclosure may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
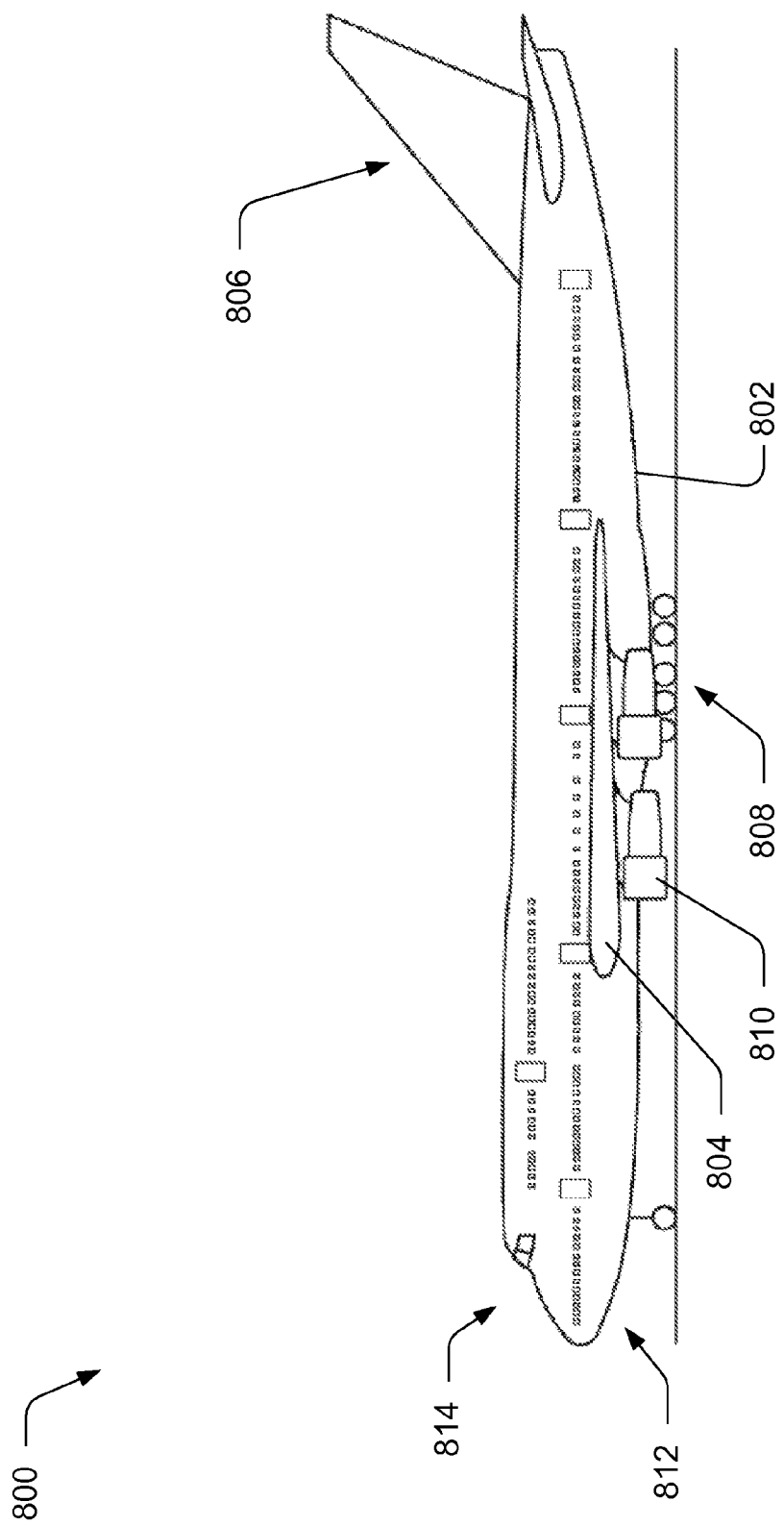
FIG. 8 is a side elevational view of an aircraft having a dimmable head-up display in accordance with yet another embodiment of the invention.

FIG. 8 is a side elevational view of an aircraft 800 having a dimmable head-up display in accordance with yet another embodiment of the invention. One may appreciate that embodiments of dimmable head-up display may be employed in a wide variety of circumstances and settings, including cockpits, cabins, and other operator control settings for movable platforms such as motor vehicles, aircraft, maritime vessels, or spacecraft, or other suitable systems including applications with wearable dimmable head-up displays such as visor combiners. For example, an aircraft 800 may have one or more dimmable head-up displays in accordance with an embodiment of the invention.

In this embodiment, the aircraft 800 includes a fuselage 802 including wing assemblies 804, a tail assembly 806, and a landing assembly 808. The aircraft 800 further includes one or more propulsion units 810, a control system 812 (not visible), and a host of other systems and subsystems that enable proper operation of the aircraft 800. One should appreciate that embodiments of dimmable HUD's in accordance with the invention may be employed in the aircraft 800, such as in a cockpit configured dimmable HUD 814, and any other suitable areas of the aircraft 800. In general, except for the cockpit configured dimmable HUD 814 in accordance with embodiments of the invention, the various components and subsystems of the aircraft 800 may be of known construction and, for the sake of brevity, will not be described in detail herein.

Although the aircraft 800 shown in FIG. 8 is generally representative of a commercial passenger aircraft, including, for example, the 737, 747, 757, 767, 777, and 787 models commercially available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A dimmable head-up display, comprising:
   a display portion configured to provide head-up display information to an operator, the display portion to enable the operator to view a field-of-view through the display portion where the field-of-view is situated such that the display portion is located between the operator and the field-of-view; and
   a dimmable portion coupled to the display portion and configured to adjust a transmissivity of light thorough the display portion, the dimmable portion including a plurality of dimmable segments configured to independently vary levels of transmissivity of light through each of the plurality of dimmable segments based at least in part on a measured level of ambient light, wherein at least a portion of the plurality of dimmable segments form an elliptical viewing area within the dimmable display to define an outer segmenting parameter and an inner segmenting parameter that is surrounded by the outer segmenting parameter, the inner segmenting parameter accommodating the operator's direct line of sight and the outer segmenting parameter accommodating the operator's peripheral vision, and wherein at least one of the inner segmenting parameter or the outer segmenting parameter is subdivided into sub-segments that independently vary levels of transmissivity of light through each of the sub-segments.

2. The head-up display of claim 1, further comprising a combiner control system in communication with the dimmable portion and configured to receive one or more inputs including:
a manual control input from an operator; and
a light sensor input from a light sensor to measure the level of ambient light.

3. The head-up display of claim 1, wherein the head-up display is configured in one of:
a helmet mounted head-up display;
a movable visor head-up display; and
a fixably mounted head up display in a moveable platform.

4. The head-up display of claim 1, wherein the display portion is configured to receive a projected display from a projector.

5. The head-up display of claim 1, wherein the display portion includes a liquid crystal display to provide information to the operator.

6. A system for providing a dimmable head-up display, comprising:
a dimmable combiner configured to provide head-up display information to an operator, the dimmable combiner adjustable from a substantially transparent level to a less transparent level, the combiner being at least partially transparent such that the operator can view objects beyond the combiner, the dimmable combiner including a plurality of dimmable segments that define at least an outer segment and an inner segment that is circumscribed by the outer segment, wherein the inner segment accommodates the operator's direct line of sight and the outer segment accommodates the operator's peripheral vision, and wherein at least one of the inner segment or the outer segment is subdivided into sub-segments that independently vary levels of transmissivity of light through each of the sub-segments;
a light sensor configured to detect the light intensity of an environment proximate the dimmable combiner; and
a combiner control module configured to receive a light sensor signal from the light sensor and transmit control signals to the at least the outer segment and the inner segment of the dimmable combiner for adjusting the transmissivity of the dimmable combiner.

7. The system of claim 6, further comprising a manual combiner control input configured to receive an operator input, the combiner control module configured to receive the operator input from the manual combiner control input, the control signal for adjusting the transparency of the dimmable combiner depending on at least one of the operator input and the light sensor signal.

8. The system of claim 6, further comprising:
an imaging device configured to produce an image of a head-up display with the combiner for viewing by an operator; and
an imaging control module configured to receive an input from the light sensor and transmit a signal to the imaging device for adjusting the head-up display on the dimmable combiner.

9. The system of claim 8, wherein the imaging control module is configured to receive a manual imaging control input configured to receive an image input, the imaging control module configured to receive the image input from the manual imaging control input and transmit the image input to the imaging device for adjusting the imaging device.

10. The system of claim 8, wherein the combiner control module is in communication with the imaging control module, the combiner control module sending a signal to the imaging control module when the combiner control module adjusts the transparency of the combiner, the imaging control module processing the signal and adjusting transparency of the imaging device to improve the head-up display information visibility for the operator.

11. The system of claim 6, wherein the dimmable head-up display is configured for at least one of an aircraft and a passenger vehicle.

12. The system of claim 6, wherein head-up display includes a fail-safe setting configured to increase the transmissivity of the dimmable combiner to a substantially transparent state.

13. The system of claim 6, wherein the dimmable combiner utilizes one of an electrochromic layer and a photochromic layer to adjust the transmissivity of the dimmable combiner.

14. A method for providing a dimmable head-up display to enable an operator to view information on a substantially transparent display, comprising:
receiving an input from an operator to control a transmissivity of light through at least a portion of a dimmable head-up display;
receiving a light intensity value from a light sensor; and
adjusting a transmissivity of a plurality of segments of the dimmable head-up display based at least in part on the input from the operator and the light intensity value, the adjustment of the transmissivity to individually increase or reduce the transparency of each of the plurality of segments of the dimmable head-up display, the dimmable head-up display enabling the operator to view objects beyond the dimmable head-up display, wherein the input from the operator causes an proportional adjustment of the transmissivity of light across the plurality of segments of the dimmable head-up display while the light sensor value causes each of the plurality of segments of the dimmable head-up display to individually adjust based on the light sensor value such that a first segment includes a different adjustment than a second segment of the plurality of segments, wherein the first segment is an outer segmenting parameter and the second segment is an inner segmenting parameter that is surrounded by the outer segmenting parameter, and wherein the inner segmenting parameter accommodates the operator's direct line of sight and the outer segmenting parameter accommodates the operator's peripheral vision, and wherein at least one of the inner segmenting parameter or the outer segmenting parameter is subdivided into sub-segments that independently vary levels of transmissivity of light through each of the sub-segments.

15. The method of claim 14, further comprising incrementally adjusting the transmissivity of the combiner utilizing the light intensity measurement in a closed loop system until a light intensity limit is obtained through the head-up display.

16. The method of claim 14, further comprising adjusting a projection display on the dimmable combiner, the projection display providing a head-up display viewable by the operator.

* * * * *